United States Patent
Devireddy et al.

(10) Patent No.: US 11,997,067 B2
(45) Date of Patent: May 28, 2024

(54) MANAGING INTERNET PROTOCOL (IP) ADDRESS ALLOCATION TO TENANTS IN A COMPUTING ENVIRONMENT

(71) Applicant: VMware LLC, Palo Alto, CA (US)

(72) Inventors: Dileep K Devireddy, San Jose, CA (US); Ankit Parmar, Santa Clara, CA (US); Hiteshkumar Rameshchandra Patel, Newark, CA (US)

(73) Assignee: VMware LLC, Palo Alto, CA (US)

( * ) Notice: Subject to any disclaimer, the term of this patent is extended or adjusted under 35 U.S.C. 154(b) by 225 days.

(21) Appl. No.: 17/155,405

(22) Filed: Jan. 22, 2021

(65) Prior Publication Data

US 2022/0239627 A1  Jul. 28, 2022

(51) Int. Cl.
*H04L 61/5061* (2022.01)
*G06F 9/455* (2018.01)
*H04L 61/2557* (2022.01)
*H04L 61/5007* (2022.01)

(52) U.S. Cl.
CPC ...... *H04L 61/5061* (2022.05); *G06F 9/45558* (2013.01); *H04L 61/2557* (2013.01); *H04L 61/5007* (2022.05); *G06F 2009/45595* (2013.01)

(58) Field of Classification Search
CPC ....... G06F 2009/45595; G06F 9/45558; H04L 61/2557; H04L 61/5061; H04L 61/5007
See application file for complete search history.

(56) References Cited

U.S. PATENT DOCUMENTS

| | | | |
|---|---|---|---|
| 10,693,715 B1 * | 6/2020 | Strauss | H04L 61/255 |
| 2006/0067342 A1 * | 3/2006 | Dispensa | H04L 61/2557 370/466 |
| 2015/0281059 A1 * | 10/2015 | Xiao | G06F 9/45558 709/238 |
| 2016/0234161 A1 | 8/2016 | Banerjee et al. | |
| 2017/0048130 A1 * | 2/2017 | Goliya | H04L 45/586 |
| 2017/0126497 A1 | 5/2017 | Dubey et al. | |

OTHER PUBLICATIONS

Audet et al. "Network Address Translation (NAT) Behavioral Requirements for Unicast UDP", Jan. 2007, 29 pages.
Srisuresh et al., "IP Network Address Translator (NAT) Terminology and Considerations", Aug. 1999, 31 pages.

* cited by examiner

*Primary Examiner* — Elton Williams
(74) *Attorney, Agent, or Firm* — Quarles & Brady LLP (57) ABSTRACT

Described herein are systems, methods, and software to manage internet protocol (IP) address allocation for tenants in a computing environment. In one implementation, a logical router associated with a tenant in the computing environment requests a public IP address for a new segment instance from a controller. In response to the request, the controller may select a public IP address from a pool of available IP addresses and update networking address translation (NAT) on the logical router to associate the public IP address with a private IP address allocated to the new segment instance.

18 Claims, 6 Drawing Sheets

MANAGING INTERNET PROTOCOL (IP) ADDRESS ALLOCATION TO TENANTS IN A COMPUTING ENVIRONMENT

TECHNICAL BACKGROUND

In computing environments, such as software defined data centers (SDDCs), workload virtual nodes for a tenant can connect to a logical router, sometimes referred to as a Tier-1 or T1 logical router, that is implemented by the SDDC provider. Each tenant in a data center may be allocated its own T1 logical router to support the operations of the workload virtual nodes (virtual machines, containers, or other virtualized endpoints) for that tenant. To connect the T1 logical routers to the internet, each of the T1 logical routers may connect to a Tier-0 or T0 logical router, wherein the T0 logical router includes downlink ports that connect to the one or more T1 logical routers in the environment and uplink ports that connect to external networks, such as the internet.

For example, a tenant may include a three tier application that includes web segment virtual nodes, application segment virtual nodes, and database segment virtual nodes. The virtual nodes may be coupled to a T1 logical router that, in turn, communicates with a T0 logical router to provide connectivity to external networks.

While a T0 logical router provides a mechanism for tenants to communicate with external networks, difficulties can arise in assigning public internet protocol (IP) addresses to the tenants and configuring network address translation (NAT) at the T1 logical routers to support the coupled virtual nodes. In particular, using web segment virtual nodes, a tenant may require that at least one virtual node is available via a public IP address from external network (e.g., internet). However, current mechanisms can make it difficult to quickly allocate public IP addresses to new nodes in a computing environment. In particular, some current implementations may require an application programming interface (API) request or some other request to an internet service provider (ISP) each time that a new public IP address is required for a virtual node. These requests may cause delays in efficiently allocating a public IP address to a new virtual node.

SUMMARY

The technology described herein manages internet protocol (IP) address allocation to tenants in a computing environment. In one example, a controller identifies a request for a logical router associated with a first tenant of a plurality of tenants for a public IP address for a new node. In response to the request, the controller may select a public IP address from a pool of available public IP addresses and may update network address translation (NAT) rules to associate a private IP address for the node to the IP address. In some examples, the update to the NAT rules may also cause an update to a next hop configuration at a second logical router to forward packets with the public IP address to the logical router associated with the tenant, wherein the second logical router couples the logical router to one or more external networks (e.g., the internet).

DETAILED DESCRIPTION

Figure 1:
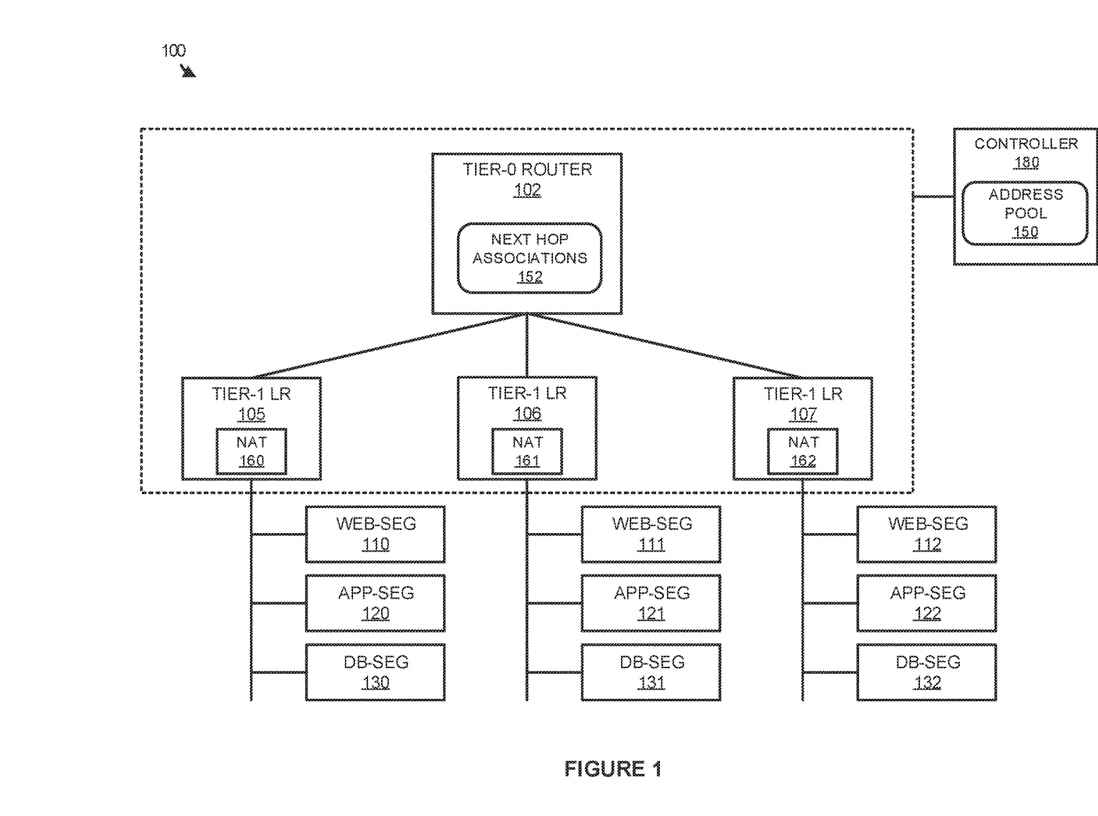
FIG. 1 illustrates a computing environment to manage internet protocol (IP) address allocation to tenants in a computing environment according to an implementation.

FIG. 1 illustrates a computing environment 100 to manage internet protocol (IP) address allocation to tenants in a computing environment according to an implementation. Computing environment 100 includes tier-0 logical router 102, tier-1 logical routers 105-107 and controller 180. Tier-1 logical routers 105-107 each include a corresponding network address translation (NAT) 160-162 and provide connectivity for segments 110-112, 120-122, and 130-132. Tier-0 logical router 102 includes next hop associations 152 and controller 180 includes address pool 150 that is used to allocate public IP addresses to virtual nodes in segments 110-112, 120-122, and 130-132. The elements of computing environment 100 including the logical routers, the controller, and the segment virtual nodes may be executed across one or more host computing systems, such as servers or desktop computing systems. The logical routers and controller may each execute on a single computing system or may execute across multiple computing systems.

In operation, segments 110-112, 120-122, and 130-132 are deployed to support operations of different tenants, wherein each segment of segments 110-112, 120-122, and 130-132 may include one or more virtual nodes, such as virtual machines, containers, or some other virtualized endpoint. To support the connectivity for the virtual nodes, tier-1 logical routers are provided that can provide domain name services (DNS), Dynamic Host Configuration Protocol (DHCP), firewall service, and NAT services (demonstrated by NATs 160-162). NATs 160-162 may be used to identify packets associated with a first address, such as a public internet protocol (IP) address and convert the addresses to a second IP address or local IP address. Connected to tier-1 logical routers 105-107 is tier-0 logical router 102, wherein the tier-0 logical router may be used to connect each of logical routers to one or more external networks, such as the internet. In some implementations, tier-0 logical router 102 may be provided and managed by the service provider for the various tenants in computing environment 100. Tier-0 logical router 102 may be used to implement next-hop forwarding to each of the tier-1 logical routers, implement additional firewall rules, or provide some other operation with respect to data packets from external networks and the tier-1 logical routers.

In configuring the networking for each tenant associated with each tier-1 logical router, controller 180 is provided, which operates in the control plane separate from the data plane for the various tenants and can be used to configure NATs, firewalls, and other operations provided by the logical routers. To provide connectivity for some of the virtual nodes, public IP addresses may be required, permitting computing elements on external networks to communicate with the virtual nodes. For example, tier-1 logical router 105 may represent an organization that requires virtual nodes in web segment 110 to support incoming connections from one or more computing elements executing on external networks. To support the requirement, a request may be generated for tier-1 logical router 105 that is received by controller 180. Once received, controller 180 may select a public IP address to support the request and configure logical routers 105 and 102 to support the use of the public IP address by the corresponding virtual node.

Here, controller 180 maintains address pool 150, wherein address pool 150 includes available public IP addresses to allocate to virtual nodes in computing environment 100. In some implementations, address pool 150 may be populated using an application programming interface (API) or some other function capable of obtaining public IP addresses from an internet service provider (ISP) or other service. The address pool includes IP addresses that are allocated to the tier-0 router to direct traffic to the tier-0 router from outside networks (e.g., the internet), but are not yet allocated to virtual nodes in the computing environment. Advantageously, rather than requesting new IP addresses from the ISP at the time of requirement for a new virtual node, the pool can be used to provide already allocated public IP addresses for the tier-0 logical router to a new virtual node. As address pool 150 is maintained, a new virtual node may be coupled to a tier-1 logical router of tier-1 logical routers 105-107. When coupled to a logical port, the tier-1 logical router may determine whether the new virtual node requires a public IP address. In some implementations, a user or administrator associated with a tenant may indicate the types of virtual nodes or segments that require an IP address when coupled to a corresponding tier-1 logical router. For example, an administrator associated with tier-1 logical router 105 may indicate that all virtual nodes in web segments 110 should be assigned a public IP address. In response to identifying a new virtual node for the segment, tier-1 logical router may generate a request to controller 180 indicating a requirement for a new public IP address.

After receiving the request, controller 180 may identify an available IP address in address pool 150 and allocate the address to the new virtual node. In some implementations, in allocating the public IP address to support the request, controller 180 may update NAT 160 and may update next hop associations 152 to support the forwarding of packets using the public IP address. In particular, controller 180 may update NAT 160 to associate the public IP address with a private IP address allocated by tier-1 logical router 105. For example, tier-1 logical router 105 may assign a private IP address 192.168.1.1 to a virtual node and associate the address to a public address, such as 52.1.1.7. In some implementations, a pool of private IP addresses may be made available for newly connecting virtual nodes at the tier-1 logical router and a private IP address may be selected from the pool to support a newly connected virtual node. This selection may be made by controller 180 in some examples. In some implementations, the pool may be different for each of the segments, wherein a web segment may be associated with a first pool of IP addresses, while the application segment may be associated with a second pool of IP addresses. If the pool or pools satisfy one or more criteria indicating a limited number of available IP addresses (e.g., falling below a threshold number of private IP addresses), a notification may be provided by controller 180 to an administrator associated with the tier-1 logical router, controller 180 may automatically add one or more additional IP addresses to the pool, or may provide some other function.

In addition to updating NAT 160, controller 180 may also initiate an update of next hop associations 152, wherein the routes in next hop associations may be used to forward communications associated with the selected public IP address to the corresponding tier-1 router of routers 105-107. Returning to the example of the allocation of 52.1.1.7 to a segment in tier-1 logical router 105, controller 180 may initiate an update to next hop associations 152 to ensure that tier-1 logical router 105 is the next hop for packets with 52.1.1.7 as the destination.

Once the NAT and the next hop associations are configured, incoming packets received from an outside network with a destination of 52.1.1.7 at tier-0 logical router 102 are forwarded to tier-1 logical router 105. Tier-1 logical router 105 may perform a NAT in association with the destination address and forward the packet to the destination virtual node or segment instance for tier-1 logical router 105.

In some implementations, once a public IP address is allocated to a virtual node for one of the tenants, the IP address is removed from address pool 150. Accordingly, when a second request is identified by controller 180 for a public IP address, a different public IP address may be selected to support the request. In some examples, the quantity of IP addresses in the pool may satisfy one or more criteria, such that controller 180 may request and obtain additional IP addresses for the pool. For example, when ten IP addresses remain in the pool, controller 180 may use the APIs or other functions to update the pool in preparation for additional requests.

Figure 2:
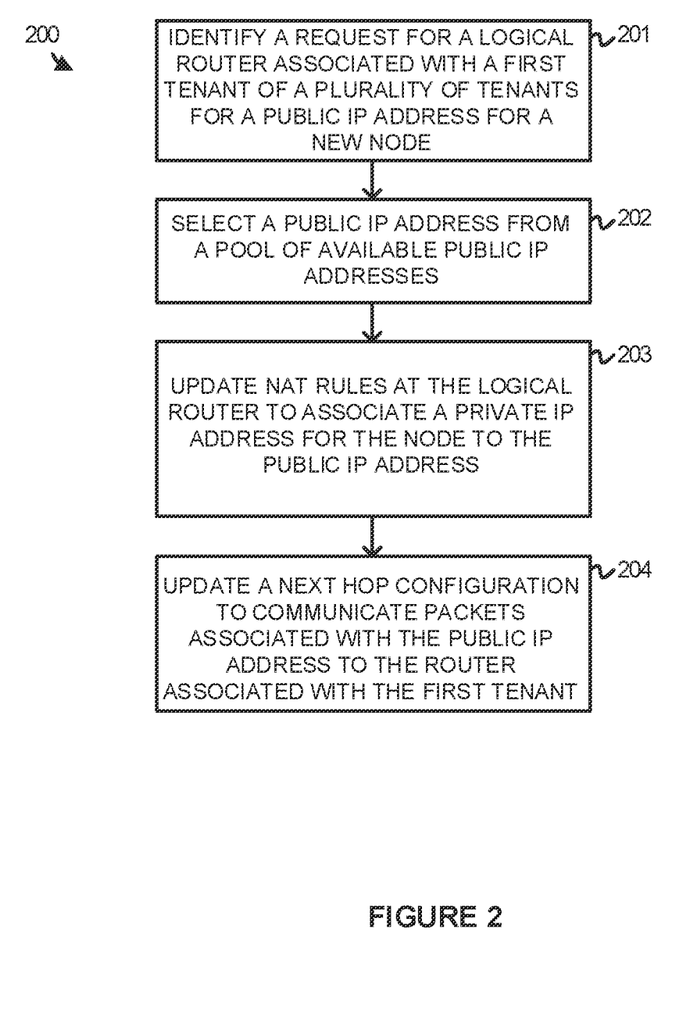
FIG. 2 illustrates a method of managing IP address allocation to tenants in a computing environment according to an implementation.

FIG. 2 illustrates a method 200 of managing IP address allocation to tenants in a computing environment according to an implementation. The steps of method 200 are referenced parenthetically in the paragraphs that follow with reference to systems and elements from computing environment 100 of FIG. 1. The steps of method 200 may be performed entirely by controller 180, although other controlling mechanisms may exist in the computing environment.

As depicted, method 200 includes identifying (201) a request for a logical router associated with a first tenant of a plurality of tenants to obtain a public IP address for a virtual node. For example, with the addition of a virtual node, tier-1 logical router 105 may generate a request for a public IP address that is identified by controller 180. Controller 180 may communicate with tier-1 logical router 105 using the control plane, wherein the control plane communicates configuration outside of the data plane for the various nodes represented as segments in computing environment 100. In some implementations, when a virtual node is coupled to tier-1 logical router 105, the logical router may determine whether the new virtual node requires a public IP address. If the new node does not require a public IP address, then a request may not be required to controller 180. However, if the new virtual node does require a public IP address, tier-1 logical router 105 may communicate a request to controller 180 for an IP address to support the new segment instance.

In response to the request, that method includes, at the controller, selecting (202) a public IP address from a pool of available public IP addresses. In some implementations, controller 180 may obtain IP addresses from a provider (ISP) and maintain a pool of the IP addresses to allocate to new segment instances (virtual nodes) in computing environment 100. The pool may include addresses allocated to the tier-0 logical router to direct traffic from the public networks to the tier-0 logical router but have not been assigned to virtual nodes in the computing environment. Once selected, the IP address may be removed from the pool, such that the same address is not allocated to another request. Advantageously, rather than requesting new IP addresses from the ISP at the time of requirement for a new virtual node, the pool can be used to provide an already allocated public IP address for the tier-0 logical router to forward packets to the virtual node.

Once the public IP address is selected, method 200 further updates (203) NAT rules at the logical router to associate a private IP address for the virtual node to the public IP address. In some implementations, the tier-1 logical routers in a computing environment may maintain NAT rules that are used to associate a private IP address to a public IP address for the virtual nodes executing for a particular tenant. For example, an NAT rule for tier-1 logical router 105 may be used to associate a public IP address for a virtual node in web segment 110 to a private IP address for the virtual node. When a packet is received, tier-1 logical router 105 may translate the private IP address in the packet and forward the packet to the destination node. In some implementations, the private IP address for the new virtual node may be allocated from a pool of available private IP addresses at the tier-1 logical router. The private IP address may be allocated by controller 180 alongside the public IP address in some examples. In some embodiments, controller 180 may monitor the size of the private IP address pool at the tier-1 logical router and determine when additional private IP addresses are required for the tier-1 logical router. The determination may be based on the number of IP addresses falling below a threshold number, the predicted number of IP addresses required in the near future being more than the available IP addresses in the pool, or some other criteria. Once additional IP addresses are required, the controller may notify an administrator associated with the tier-1 logical router that additional private IP addresses are required, may automatically add additional private IP addresses, or may provide some other operation associated with adding IP addresses to the pool. In some implementations, each of the tier-1 logical routers may maintain multiple pools, wherein each of the pools can correspond to a different segment. Accordingly, while a web segment may be associated with a first pool, an application segment may be associated with a second pool. These pools may comprise different subnets in some implementations.

In some implementations, in addition to configuring the NAT rules at a logical router, controller 180 may also initiate an update to next hop associations 152, wherein next hop associations 152 are used to identify a logical router to forward packets received from an external network. In some examples, each tier-1 logical router of logical routers 105-107 is allocated its own IP address, such that tier-0 logical router 102 can forward packets to the router. As a result, when a public IP address is allocated to a virtual node coupled to one of the logical routers 105-107, next hop associations 152 may be updated to associate the public IP address with the IP address of the associated logical router. When a packet is received by tier-0 logical router 102, tier-0 logical router 102 may identify the destination IP address for the packet, determine a next hop IP address for the tier-1 logical router associated with the destination IP address, and forward the packet to the corresponding tier-1 logical router.

In some examples, as the IP addresses are allocated from IP address pool 150, controller 180 may determine when the IP address pool satisfies one or more criteria to retrieve additional addresses. The one or more criteria may include a quantity of available addresses, wherein controller 180 may identify when the pool reaches a quantity of available addresses and uses an API or other operations to obtain additional IP addresses from a provider (ISP). In some implementations, controller 180 may predict the quantity of IP addresses that are required to be assigned to virtual nodes during a future time period. The prediction may be based on monitoring the quantity of requests for public IPs during a most recent period (e.g., most recent 15 minutes), during a similar time period (e.g., time of day, week, and the like), or based on some other monitoring of the requests. For example, controller 180 may predict that fifteen addresses will be required in a future time period (e.g., the next five minutes). Consequently, controller 180 may use APIs prior to the time period to obtain at least the required quantity of IP addresses from the ISP for the pool. In some examples, the predicted requirement for the pool may include public IPs that are surrendered from retired virtual nodes, wherein the IP addresses may be reallocated to other virtual nodes.

In addition to allocating the public IP addresses to the various tenants in computing environment 100, controller 180 may further be configured to update the NATs and next hop associations based on segment instances being stopped or initiating a request to remove an allocated IP address. For example, tier-1 logical router 105 may identify a request to remove the allocation of the public IP address for a virtual node. In response to the request, the NAT may be updated to remove the association between the private IP address and the public IP address, a notification may be provided to the controller to release the public IP address back to the pool of IP addresses, and a notification may be provided to the tier-0 logical router to remove the next-hop association for the public IP address.

Figure 3:
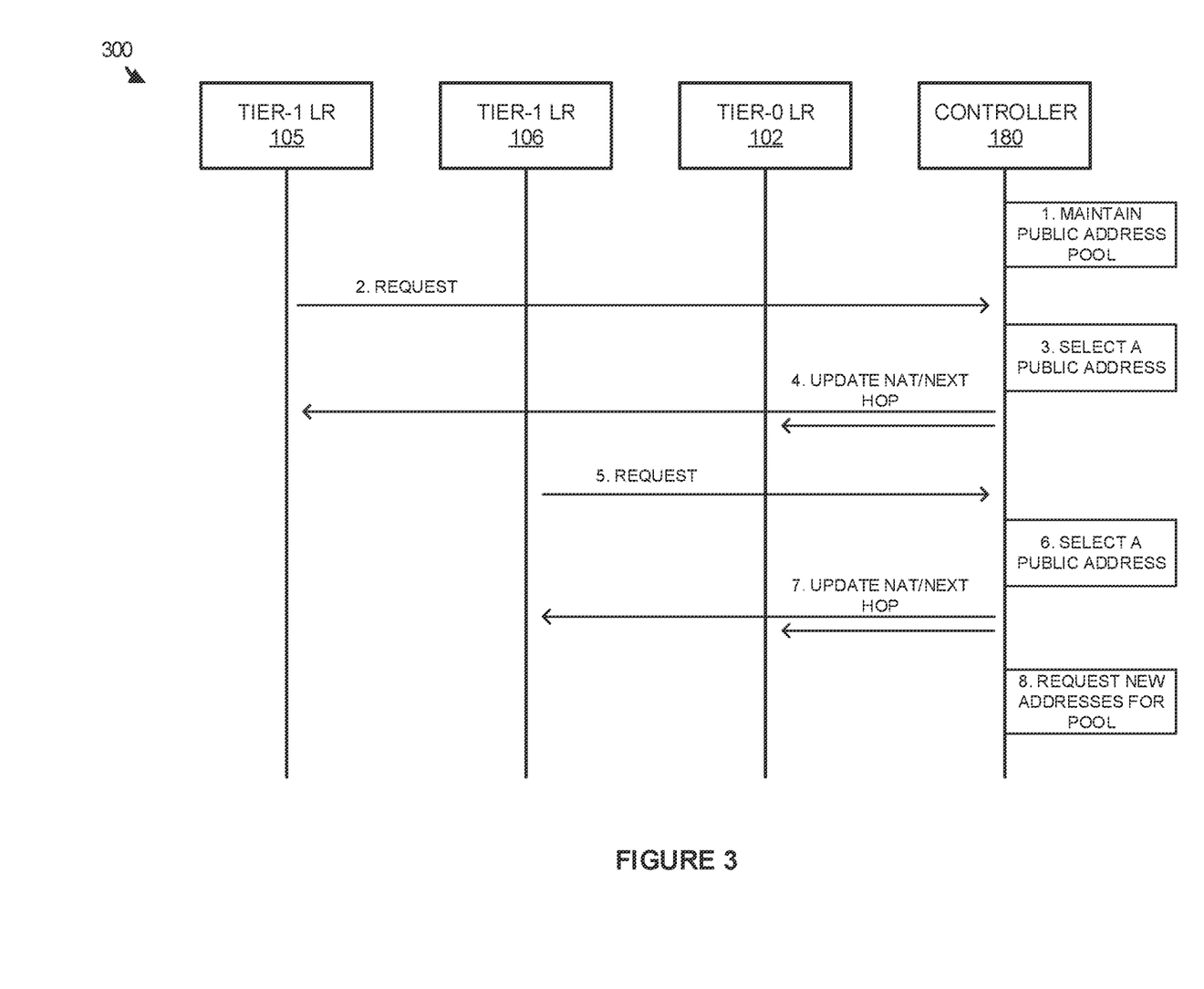
FIG. 3 illustrates a timing diagram of allocating IP addresses to tenants according to an implementation.

FIG. 3 illustrates a timing diagram 300 of allocating IP addresses to tenants according to an implementation. Timing diagram 300 includes tier-1 logical routers 105-106, tier-0 logical router 102, and controller 180. Tier 1 logical router 107 has been omitted for clarity.

As depicted, controller 180 maintains, at step 1, a public address pool, wherein the public address pool may include addresses that be used by computing elements on one or more external networks to communicate with nodes executing behind tier-0 logical router 102. As the public address pool is maintained, tier-1 logical router 105 generates a request, at step 2 for a public IP address to support a segment behind tier-1 logical router 105. For example, tier-1 logical router 105 may be initiate a request for a new public IP address to support a web segment of an application behind tier-1 logical router 105.

In response to the request, controller 180 may select, at step 3, a public IP address from the pool and update, at step 4, a NAT for tier-1 logical router 105 and a next hop configuration for tier-0 logical router 102. In some implementations, the public IP address may be selected randomly from the pool, from a list that represents the pool of available addresses, or from some other data structure or manner. Once selected, the NAT for tier-1 logical router 105 may be updated to associate the selected public IP address with a private IP address for the node behind tier-1 logical router 105, wherein the private IP address may be selected by tier-1 logical router 105 when the request for the virtual node is identified. For example, tier-1 logical router 105 may monitor for when a new virtual node is coupled to a port of the logical router. When coupled, tier-1 logical router 105 may select a private IP address for the new virtual node and request a public IP address for a NAT association.

In addition to configuring the NAT at tier-1 logical router 105, controller 180 may also initiate an update to the next hop configuration of tier-0 logical router 102. The update may be used to direct communications associated with the public IP address to tier-1 logical router 105. In directing the packets, tier-0 logical router 102 may forward the packets to an IP address for the router.

After allocating an IP address to tier-1 logical router 105 to support a new instance in a segment, controller 180 receives a second request, at step 5, from tier-1 logical router 106. In response to the request, controller 180 may select, at step 6, a second public IP address to support the request from the pool of available IP addresses. Once selected, controller 180 may update, at step 7, a NAT for tier-1 logical router 106 and update a next hop configuration for tier-0 logical router 102. Similar to the operations described above with configuring for the request of tier-1 logical router 105, the configuration of tier-1 logical router 106 may update a NAT to associate a private IP address allocated by tier-1 logical router 106 to the second public IP address. Additionally, the configuration of tier-0 logical router 102 may be used to forward incoming packets with the second public IP address to tier-1 logical router 106.

In some implementations, controller 180 may monitor the size of the available IP address pool. In particular, as the number of available addresses decreases and satisfies one or more criteria, controller 180 may request, at step 8, new addresses for the pool to accommodate additional requests from the tier-1 routers in computing environment 100. In some implementations, the pool may also be expanded when a tier-1 logical router relinquishes a public IP address. In particular, a tier-1 logical router may remove the NAT association with a public IP address and notify controller 180, such that controller 180 may add the public IP address back to the available pool. Further, controller 180 may update a next hop configuration to stop packets associated with the public IP address from being forwarded to the tier-1 logical router.

In some implementations, controller 180 may predict the quantity of IP addresses that are required to be assigned to virtual nodes during a future time period. The prediction may be based on monitoring the quantity of requests for public IPs during a most recent period (e.g., most recent 15 minutes), during a similar time period (e.g., time of day, week, and the like), or based on some other monitoring of the requests during any time period. For example, controller 180 may predict that thirty addresses will be required in a future time period (e.g., the next five minutes). As a result, controller 180 may obtain at least the required quantity of IP addresses from the ISP for the pool. In some examples, the predicted requirement for the pool may include public IPs that are surrendered from retired virtual nodes, wherein the IP addresses may be reallocated to other virtual nodes. This may permit controller 180 to maintain a pool using new IPs from the ISP and IPs that are surrendered from retired virtual nodes.

Figures 4, 5:
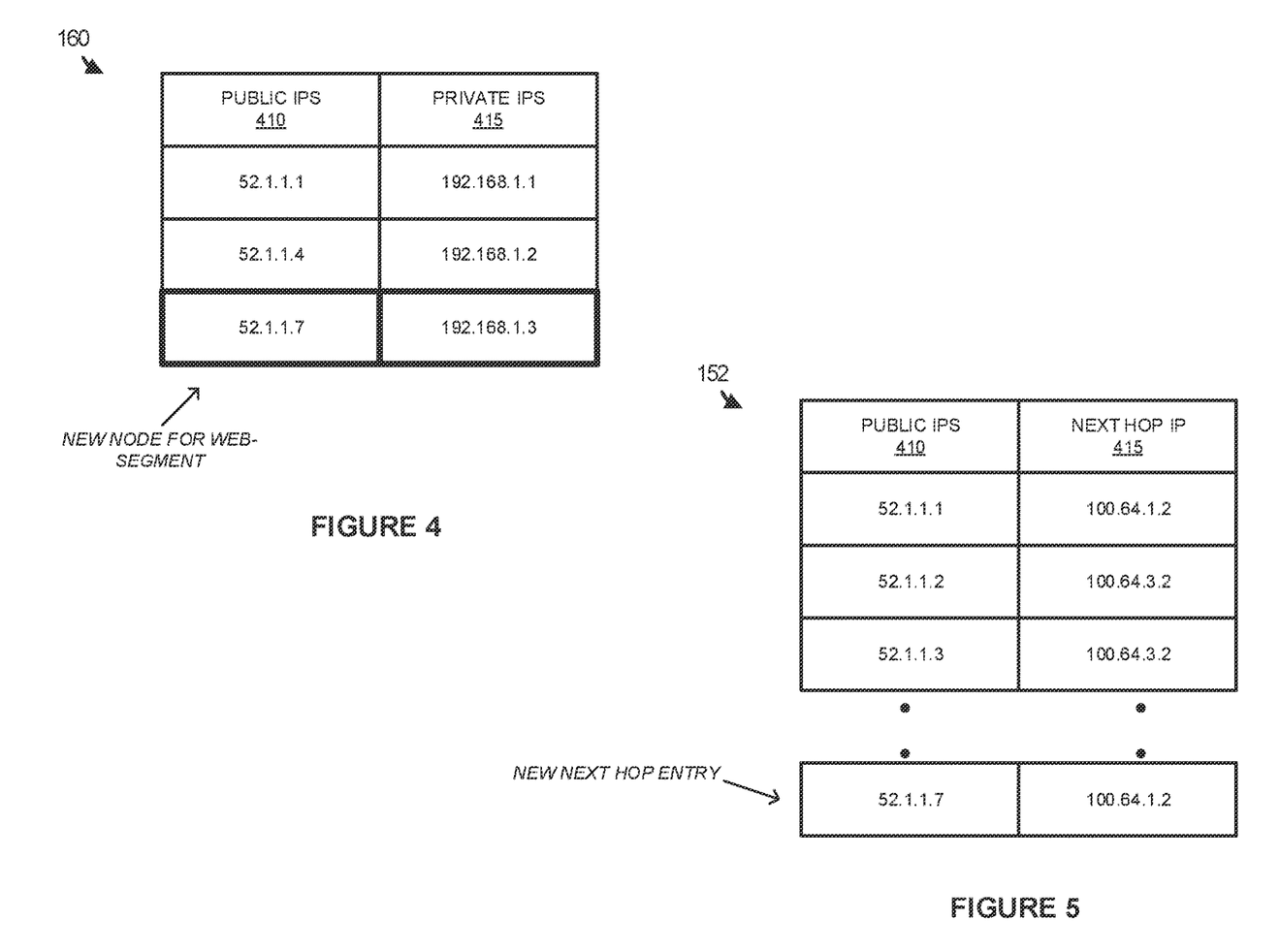
FIG. 4 illustrates an update to a network address translation (NAT) data structure according to an implementation.
FIG. 5 illustrates an update to a next hop configuration to forward packets to an associated logical router according to an implementation.

FIG. 4 illustrates an update to a network address translation (NAT) data structure according to an implementation. FIG. 4 includes an example of NAT 160 from FIG. 1, although examples may exist. Data structure 160 includes columns for public IPs 410 and private IPs 415.

In operation, a tier-1 logical router in a computing environment may identify a request to allocate a public IP address to an instance in a segment, wherein the instance may comprise a virtual machine in some examples. For example, the tier-1 logical router may identify a new connection and determine whether the connection requires an allocation of a public IP based on configuration information associated with the new connection. In some implementations, the tier-1 logical router may determine the segment associated with the new connection, wherein the segment may be associated with a requirement for a new public IP address. In response to the request, the tier-1 logical router may allocate a private IP address, wherein the private IP address may fall in the subnet for the segment associated with the new connection. Additionally, the tier-1 logical router may communicate a request to the controller to allocate a public IP address from a pool of available public IP addresses.

Here, a new connection for the web segment 110 of FIG. 1 is allocated a public IP address of 52.1.1.7 by the controller and is also allocated a private IP address of 192.168.1.3 by the controller. Once the public IP address is identified by the controller, the controller may update the NAT at the tier-1 logical router to include the association between the private IP address and the public IP address, wherein the update is used to translate addressing in a packet from the public IP to the private IP and from the private IP to the public IP.

FIG. 5 illustrates an update to a next hop configuration to forward packets to an associated logical router according to an implementation. FIG. 5 includes an example of next hop associations 152, although other examples may exist. Next hop associations 152 includes columns for public IPs 410 and next hop IPs 415.

In operation, requests are generated by tier-1 logical routers to allocate public IP addresses to nodes supported by the tier-1 logical router. For example, each tier-1 logical router may represent a tenant in a computing environment, wherein the tenant may comprise a company, an organization, a group within an organization, or some other entity. Each of the tenants may use the tier-1 logical router to support one or more segments for an application. For example, a first tier-1 logical router may be used to provide a three tier application, wherein the application may include a web segment, an application segment, and a database segment. When a new virtual node is added or connected to the tier-1 logical router, the tier-1 logical router may determine whether the virtual node requires a public IP address. This determination may be based on a segment identifier associated with the virtual node, metadata provided by an administrator initiating the virtual node, or some other information. When a public IP address is required, the tier-1 logical router may allocate a private IP address to the virtual nodes, wherein the private address may be on a local subnet provided by the tier-1 logical router. Additionally, the tier-1 logical router may communicate a request to the controller to obtain an available public IP address. Once allocated or selected from a pool by the controller, the controller may update a NAT of the tier-1 logical router to include an association between the private and public IP addresses.

Here, in addition to updating the NAT, the controller may update next hop associations 152 to forward packets to the appropriate tier-1 logical router based on the destination IP address. In particular, when a packet is received at the tier-0 logical router from an external network, the tier-0 logical router may identify a destination IP address in that packet and match the destination IP address to a next hop IP address associated with the tier-1 logical router. When a new public IP address 52.1.1.7 is allocated to a node in the computing environment, an update may be provided to the tier-0 logical router associating the public IP address to a next-hop IP address for the tier-1 logical router supporting the new node. In this example, the next hop IP address is 100.64.1.2, which corresponds to tier-1 logical router 105. Once configured, packets from external networks with the public destination IP address of 52.1.1.7 may be forwarded to logical router 105 with the next hop IP address of 100.64.1.2.

Although demonstrated in the examples of FIGS. 4 and 5 as adding entries to the data structures, it should be understood that entries may be removed from the data structures. In some implementations, when a public IP address is no longer required, the tier-1 logical router may identify the request to remove the allocation and update the NAT to remove the entry associated with the public IP address. Further, the tier-1 logical router may communicate a notification to the controller, wherein the controller may initiate an update to remove an entry from the next hop associations associated with the public IP address. The controller may also add the public IP address back to the pool of available IP addresses, such that a future request may be allocated the address.

Figure 6:
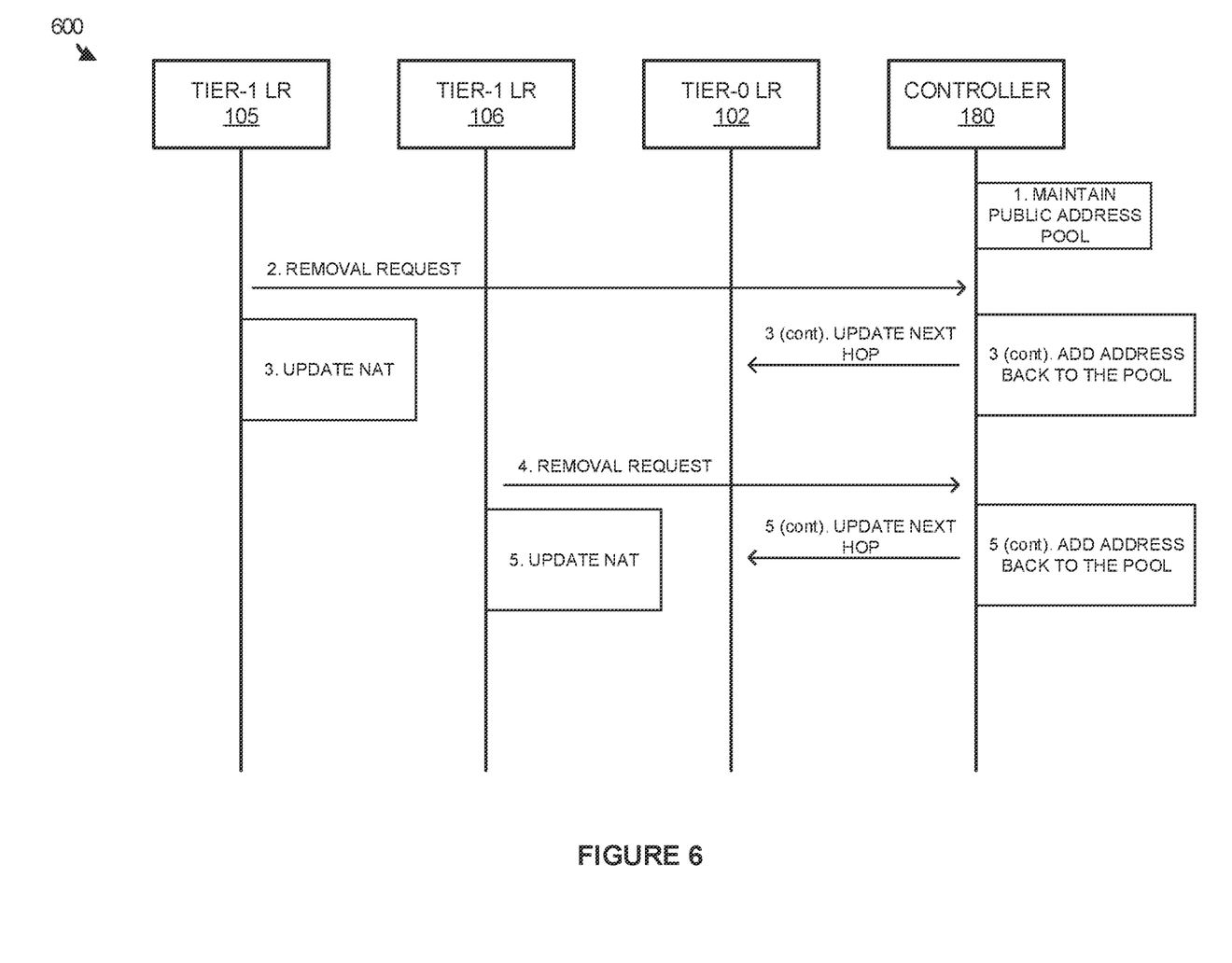
FIG. 6 illustrates a timing diagram of deallocating IP addresses to tenants according to an implementation.

FIG. 6 illustrates a timing diagram 600 of deallocating IP addresses to tenants according to an implementation. Timing diagram 600 includes tier-1 logical routers 105-106, tier-0 logical router 102, and controller 180 from computing environment 100 of FIG. 1. Tier-1 logical router 107 has been omitted for clarity.

In operation, tier-1 logical routers 105-106 may request and receive public IP address to allocate to one or more segments supported by the logical routers. These public IP addresses are allocated from controller 180, wherein controller 180 maintains, at step 1, a public IP address pool for the requests. After the IP addresses are allocated, tier-1 logical router 105 identifies, at step 2, a removal request to remove an allocated public IP address. In response to the request, tier-1 logical router 105 updates, at step 3, a local NAT to remove an association for the public IP address to a private IP address for the virtual node coupled to tier-1 logical router 105. In some implementations, tier-1 logical router 105 may monitor for when a connection no longer exists with the virtual node and may update the NAT based on the connection being removed. In addition to updating the local NAT, a request may be communicated to controller 180 indicating that the public IP address is no longer required for the segment provided by the tier-1 logical router. In response to the request, controller 180 may add, at the continuation of step 3, the public IP address back to the available pool of addresses and update a configuration of tier-0 logical router 102 to remove a next hop association for the public IP address.

In addition to the update for tier-1 logical router 105, tier-1 logical router 106 identifies a removal request, at step 4, for a public IP address. In response to the request, tier-1 logical router updates, at step 5, a local NAT to remove the association between the public IP address and the private IP address. In some implementations, the removal may be made without communicating with controller 180, but it should be understood that controller 180 may initiate the update the NAT. In addition to updating the NAT, tier-1 logical router 106 may communicate a request to deallocate the public IP address to controller 180. In response to receiving the request, controller 180 may initiate an update to tier-0 logical router 102 to update the next hop configuration and may add the public IP address back to the available pool.

In some implementations, the pool of available IP addresses at controller 180 may be maintained to include a minimum or maximum amount of IP addresses. As addresses are added back to the pool from tier-1 logical routers deallocating IP addresses, controller 180 may relinquish the IP addresses back the provider. Similarly, as additional addresses are taken by the tier-1 logical routers, controller 180 may request and receive additional IP addresses to be added to the pool.

Figure 7:
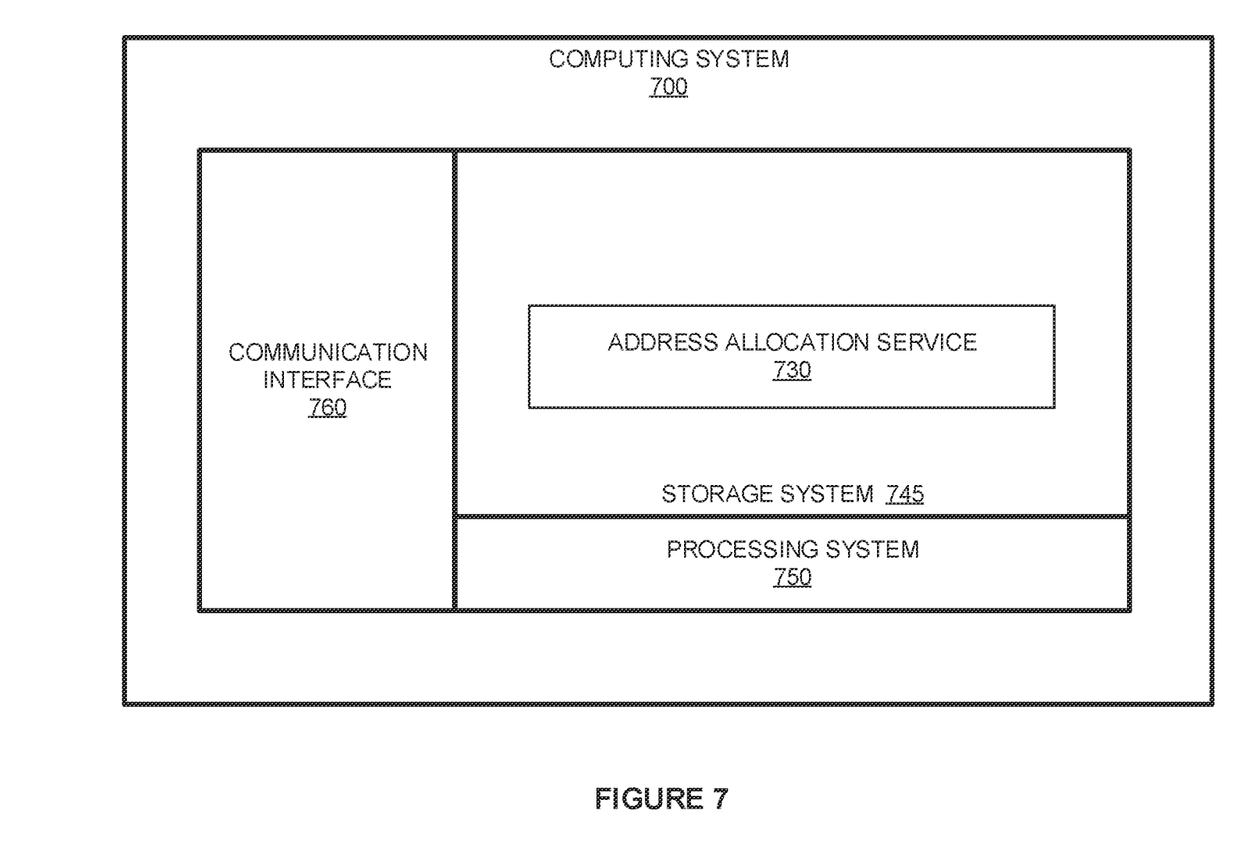
FIG. 7 illustrates a computing system to manage IP address allocation to tenants in a computing environment according to an implementation.

FIG. 7 illustrates a computing system 700 to manage IP address allocation to tenants in a computing environment according to an implementation. Computing system 700 is representative of any computing system or systems with which the various operational architectures, processes, scenarios, and sequences disclosed herein for a controller can be implemented. Computing system 700 is an example of controller 180 of FIG. 1, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 may be configured to communicate with one or more server computing systems or desktop computing systems capable of providing the platform for logical routers, virtual nodes, and the like.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises coordination service 730 that can provide at least operation 200 of FIG. 2 and operation 300 of FIG. 3. The operating software on storage system 745 may further include an operating system, utilities, drivers, network interfaces, applications, or some other type of software. When read and executed by processing system 750 the operating software on storage system 745 directs computing system 700 to operate as described herein.

In at least one implementation, service 730 directs processing system 750 to identify a request for a logical router associated with a first tenant of a plurality of tenants to obtain a public IP address for a virtual node. In some implementations, tier-1 logical routers are deployed in a computing environment to provide networking services for different tenants of the computing environment. The tenants may comprise organizations, divisions of one or more organizations, or some other tenant. Each of the tenants may deploy one or more virtual nodes that can provide one or more segments to provide different operations. These segments may include web segments, applications segments, database segments, or some other segment that can provide the desired operation for the tenant. When deployed, one or more of the segments may require a public IP address to receive communications from computing elements on one or more external networks. To support the requirement, tier-1 logical routers may identify when a new connection is identified for a virtual node that requires a public IP address and communicate a request to a controller to receive a public IP address.

Once a request is identified, service 730 may direct processing system 750 to select a public IP address from a pool of available public IP addresses and update NAT rules at the logical router to associate a private IP address for the virtual node to the public IP address. In some implementations, the logical router may allocate a private IP address in accordance with the segment for the new virtual node. Once a public IP address is allocated to the virtual node, a NAT maintained by the logical router may be updated to associate the private IP address with the public IP address.

In addition to updating the NAT, service 730 may direct processing system 750 to initiate an update of a next hop configuration at a second logical router (e.g., a tier-0 logical router) to communicate packets associated with the public IP address to the logical router associated with the first tenant, wherein the second logical router connects the logical router to one or more external networks. Once configured, packets with the destination public IP address may be forwarded to the associated tier-1 logical router using the next hop associations and the tier-1 logical router may perform address translation using the updated NAT.

In some implementations, address allocation service 730 may direct processing system 750 to identify when the pool of available IP addresses satisfies criteria to obtain additional addresses for the pool. For example, when the pool falls below a threshold number of available IP addresses, service 730 may direct processing system 750 to obtain additional IP addresses from a provider that can be supplied in future requests.

In some examples, in addition to allocating the IP addresses to the requesting tier-1 logical routers, service 720 may be used in deallocating the public IP addresses. In at least one implementation, when a public IP is no longer required for the virtual nodes supported by a tier-1 logical router, the tier-1 logical router may initiate an update to the NAT to remove an association between the public IP address and a private IP address for a local network supported by the router. Additionally, the tier-1 logical router may provide a notification to the controller indicating that the public IP address is no longer required, wherein the controller may add the public IP address back to the available pool and update the next hop configuration of a tier-0 logical router to remove an entry directing traffic associated with the public IP address to the tier-1 logical router.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of allocating internet protocol (IP) addresses comprising:
    identifying a request for a logical router associated with a first tenant of a plurality of tenants to obtain a public IP address for a virtual node;
    selecting the public IP address from a pool, the pool comprising a plurality of public IP addresses allocated to a second logical router such that traffic addressed to any of the plurality of public IP addresses is directed to the second logical router;
    updating network address translation (NAT) rules at the logical router to associate a private IP address for the virtual node to the selected public IP address; and
    updating a next hop configuration at the second logical router to communicate packets associated with the selected public IP address to the logical router associated with the first tenant, wherein the second logical router connects the logical router to one or more external networks and the logical router associated with the first tenant redirects traffic addressed to the selected public IP address to the private IP address for the virtual node.

2. The method of claim 1, wherein the one or more external networks comprise the internet.

3. The method of claim 1, wherein the virtual node comprises a virtual machine in a segment for the tenant.

4. The method of claim 1 further comprising:
    identifying a second request for a second logical router associated with a second tenant of the plurality of tenants to obtain a second public IP address for a new virtual node;
    selecting the second public IP address from the pool; and
    updating NAT rules at the second logical router to associate a second private IP address for the second virtual node to the selected second public IP address.

5. The method of claim 1 further comprising
    in response to selecting the public IP address, removing the selected public IP address from the pool.

6. The method of claim 1 further comprising:
    identifying when the pool satisfies one or more size criteria; and
    obtaining one or more additional IP addresses for the pool from a service provider.

7. The method of claim 1, wherein the one or more size criteria comprises a quantity of IP addresses in the pool.

8. The method of claim 1 further comprising:
    identifying a request to remove the selected public IP address from the virtual node;
    updating the NAT rules at the logical router to remove the association of the private IP address and the selected public IP address;
    updating the next hop configuration at the second logical router to stop communicating packets associated with the selected public IP address to the logical router associated with the first tenant; and
    adding the selected public IP address to the pool.

9. A computing apparatus comprising:
    a storage system;

a processing system operatively coupled to the storage system; and program instructions stored on the storage system that, when executed by the processing system, direct the computing apparatus to:
- identify a request for a logical router associated with a first tenant of a plurality of tenants to obtain a public IP address for a virtual node;
- select the public IP address from a pool, the pool comprising a plurality of public IP addresses allocated to a second logical router such that traffic addressed to any of the plurality of public IP addresses is directed to the second logical router;
- update network address translation (NAT) rules at the logical router to associate a private IP address for the virtual node to the selected public IP address; and
- update a next hop configuration at the second logical router to communicate packets associated with the selected public IP address to the logical router associated with the first tenant, wherein the second logical router connects the logical router to one or more external networks and the logical router associated with the first tenant redirects traffic addressed to the selected public IP address to the private IP address for the virtual node.

10. The computing apparatus of claim 9, wherein the one or more external networks comprise the internet.

11. The computing apparatus of claim 9, wherein the virtual node comprises a virtual machine in a segment for the tenant.

12. The computing apparatus of claim 9, wherein the program instructions further direct the computing apparatus to:
- identify a second request for a second logical router associated with a second tenant of the plurality of tenants to obtain a second public IP address for a new virtual node;
- select the second public IP address from the pool; and
- update NAT rules at the second logical router to associate a second private IP address for the second virtual node to the selected second public IP address.

13. The computing apparatus of claim 9, wherein the program instructions further direct the computing apparatus to:
- in response to selecting the public IP address, remove the selected public IP address from the pool.

14. The computing apparatus of claim 9, wherein the program instructions further direct the computing apparatus to:
- identify when the pool satisfies one or more size criteria; and
- obtain one or more additional IP addresses for the pool from a service provider.

15. The computing apparatus of claim 14, wherein the one or more size criteria comprises a quantity of IP addresses in the pool.

16. The computing apparatus of claim 9, wherein the program instructions further direct the computing apparatus to:
- identify a request to remove the selected public IP address from the virtual node;
- update the NAT rules at the logical router to remove the association of the private IP address and the selected public IP address;
- update the next hop configuration at the second logical router to stop communicating packets associated with the selected public IP address to the logical router associated with the first tenant; and
- add the selected public IP address to the pool.

17. An apparatus comprising:
a storage system; and
program instructions program stored on the storage system that, when executed by a processing system, direct the processing system to:
- identify a request for a logical router associated with a first tenant of a plurality of tenants to obtain a public IP address for a virtual node;
- select the public IP address from a pool, the pool comprising a plurality of public IP addresses allocated to a second logical router such that traffic addressed to any of the plurality of public IP addresses is directed to the second logical router;
- in response to selecting the public IP address, remove the selected public IP address from the pool;
- update network address translation (NAT) rules at the logical router to associate a private IP address for the virtual node to the selected public IP address; and
- update a next hop configuration at the second logical router to communicate packets associated with the selected public IP address to the logical router associated with the first tenant, wherein the second logical router connects the logical router to one or more external networks and the logical router associated with the first tenant redirects traffic addressed to the selected public IP address to the private IP address for the virtual node.

18. The apparatus of claim 17, wherein the program instructions further direct the processing system to:
- identify a request to remove the selected public IP address from the virtual node;
- update the NAT rules at the logical router to remove the association of the private IP address and the selected public IP address;
- update the next hop configuration at the second logical router to stop communicating packets associated with the selected public IP address to the logical router associated with the first tenant; and
- add the selected public IP address to the pool.

* * * * *